(12) United States Patent
Yokoyama

(10) Patent No.: US 10,054,202 B2
(45) Date of Patent: Aug. 21, 2018

(54) TORQUE CAM DEVICE AND BELT-TYPE CONTINUOUSLY VARIABLE TRANSMISSION

(71) Applicant: JATCO Ltd, Fuji-shi, Shizuoka (JP)

(72) Inventor: Kazuhiko Yokoyama, Fuji (JP)

(73) Assignee: JATCO Ltd, Fuji-Shi (JP)

( * ) Notice: Subject to any disclaimer, the term of this patent is extended or adjusted under 35 U.S.C. 154(b) by 137 days.

(21) Appl. No.: 14/917,126

(22) PCT Filed: Sep. 4, 2014

(86) PCT No.: PCT/JP2014/073281
§ 371 (c)(1),
(2) Date: Mar. 7, 2016

(87) PCT Pub. No.: WO2015/045772
PCT Pub. Date: Apr. 2, 2015

(65) Prior Publication Data
US 2016/0208892 A1  Jul. 21, 2016

(30) Foreign Application Priority Data
Sep. 25, 2013  (JP) .................................. 2013-198466

(51) Int. Cl.
*F16H 59/00* (2006.01)
*F16H 61/00* (2006.01)
(Continued)

(52) U.S. Cl.
CPC ................ *F16H 9/18* (2013.01); *F16H 9/16* (2013.01); *F16H 25/186* (2013.01); *F16H 55/36* (2013.01);
(Continued)

(58) Field of Classification Search
CPC .. F16H 55/56; F16H 61/66272; F16H 63/067; F16H 9/18; F16H 61/6625
(Continued)

(56) References Cited

U.S. PATENT DOCUMENTS 2,276,186 A * 3/1942 Getchell ............. F16H 61/6625
474/19
2,283,392 A * 5/1942 Shadrick ............. F16H 61/6625
474/19
(Continued)

FOREIGN PATENT DOCUMENTS

EP 0004487 A1 10/1979
EP 0 943 839 A2 9/1999
(Continued)

OTHER PUBLICATIONS

U.S. Appl. No. 14/917,119, filed Mar. 7, 2016, JATCO Ltd.
(Continued)

*Primary Examiner* — Henry Y Liu
(74) *Attorney, Agent, or Firm* — Foley & Lardner LLP

(57) ABSTRACT

A torque cam device includes: a drive cam member; a driven cam member; and an intermediate cam member which includes a second drive cam surface that is formed on one end, and that is arranged to be abutted on the first drive cam surface, a second driven cam surface that is formed on the other end, and that is arranged to be abutted on the first driven cam surface, and which is arranged to be rotated relative to the driven cam member and the driven cam member, the first and second drive cam surfaces being abutted on each other when a power is transmitted from the drive cam member to the driven cam member, the first and second driven cam surfaces being abutted on each other when the power is transmitted from the driven cam member to the drive cam member.

7 Claims, 7 Drawing Sheets

(51) Int. Cl.
   *F16H 63/00* (2006.01)
   *F16H 9/18* (2006.01)
   *F16H 9/16* (2006.01)
   *F16H 25/18* (2006.01)
   *F16H 61/662* (2006.01)
   *F16H 55/36* (2006.01)
   *F16H 55/56* (2006.01)

(52) U.S. Cl.
   CPC ....... *F16H 55/56* (2013.01); *F16H 61/66272* (2013.01)

(58) Field of Classification Search
   USPC .......................................................... 474/19
   See application file for complete search history.

(56) References Cited

U.S. PATENT DOCUMENTS

| | | | |
|---|---|---|---|
| 3,011,353 A | 12/1961 | Friedrich et al. | |
| 3,195,364 A * | 7/1965 | Pauli | F16H 55/56 |
| | | | 474/19 |
| 3,224,287 A * | 12/1965 | Gesche | F16H 9/12 |
| | | | 474/19 |
| 3,279,270 A * | 10/1966 | Pacak | F16H 55/56 |
| | | | 474/19 |
| 3,365,967 A * | 1/1968 | Moogk | F16H 9/14 |
| | | | 474/19 |
| 3,616,706 A * | 11/1971 | Shimamoto | F16H 55/56 |
| | | | 474/19 |
| 3,722,308 A * | 3/1973 | Steuer | F16C 19/50 |
| | | | 474/19 |
| 4,095,479 A * | 6/1978 | Lundberg | F16H 55/563 |
| | | | 474/12 |
| 4,294,137 A | 10/1981 | Piret et al. | |
| 4,378,221 A * | 3/1983 | Huff | F16H 55/56 |
| | | | 192/111.1 |
| 4,403,976 A * | 9/1983 | Takagi | F16H 55/56 |
| | | | 474/19 |
| 4,436,193 A | 3/1984 | Smirl | |
| 4,458,558 A | 7/1984 | Frank | |
| 4,459,872 A | 7/1984 | Tibbles | |
| 4,504,247 A | 3/1985 | Chana et al. | |
| 4,523,917 A * | 6/1985 | Schildt | F16H 61/6625 |
| | | | 474/19 |
| 4,585,429 A * | 4/1986 | Marier | F16H 61/66227 |
| | | | 474/12 |
| 4,592,737 A * | 6/1986 | Dhont | A01D 69/06 |
| | | | 474/17 |
| 4,608,885 A | 9/1986 | Koivunen | |
| 4,660,438 A | 4/1987 | Tatara et al. | |
| 4,747,327 A | 5/1988 | Itoh et al. | |
| 4,976,657 A * | 12/1990 | Takano | F16H 61/66227 |
| | | | 474/13 |
| 5,024,638 A | 6/1991 | Sakakibara et al. | |
| 5,080,639 A | 1/1992 | Sakakibara et al. | |
| 5,184,981 A * | 2/1993 | Wittke | F16H 61/66272 |
| | | | 474/18 |
| 5,403,240 A * | 4/1995 | Smith | F16H 55/56 |
| | | | 474/19 |
| 5,720,686 A | 2/1998 | Yan et al. | |
| 5,766,105 A * | 6/1998 | Fellows | F16H 61/6625 |
| | | | 474/17 |
| 5,937,711 A | 8/1999 | McCarrick et al. | |
| 6,336,878 B1 * | 1/2002 | Ehrlich | F16H 55/56 |
| | | | 474/18 |
| 6,379,274 B1 * | 4/2002 | Robert | F16H 55/56 |
| | | | 474/12 |
| 6,413,178 B1 * | 7/2002 | Chamberland | F16H 55/56 |
| | | | 474/12 |
| 6,502,479 B1 * | 1/2003 | Lee | F16H 55/563 |
| | | | 474/11 |
| 6,755,759 B2 * | 6/2004 | Blanchard | F16H 9/18 |
| | | | 474/19 |
| 6,758,775 B2 * | 7/2004 | Heinrich | F16H 61/66272 |
| | | | 474/17 |
| 6,860,826 B1 * | 3/2005 | Johnson | B62M 27/02 |
| | | | 180/376 |
| 6,958,025 B2 * | 10/2005 | Huddleston | F16H 55/56 |
| | | | 474/19 |
| 7,081,057 B2 * | 7/2006 | Kalies | F16H 55/56 |
| | | | 474/19 |
| 7,300,370 B2 * | 11/2007 | Wood | F16H 9/20 |
| | | | 474/10 |
| 7,901,308 B2 * | 3/2011 | Binello | F16H 55/56 |
| | | | 474/10 |
| 8,272,981 B2 * | 9/2012 | Galletti | F16H 9/12 |
| | | | 474/19 |
| 8,328,669 B2 * | 12/2012 | Nouis | F16H 63/067 |
| | | | 474/10 |
| 8,393,985 B2 * | 3/2013 | Blanchard | F16H 55/56 |
| | | | 474/19 |
| 8,496,551 B2 * | 7/2013 | Mueller | F16H 55/56 |
| | | | 474/17 |
| 8,894,520 B2 * | 11/2014 | Labbe | F16H 55/56 |
| | | | 474/19 |
| 9,005,058 B2 * | 4/2015 | Ouchida | F16H 61/66272 |
| | | | 474/19 |
| 9,909,657 B2 | 3/2018 | Uchino et al. | |
| 2002/0065157 A1 * | 5/2002 | Heinrich | F16H 61/66272 |
| | | | 474/19 |
| 2002/0115510 A1 * | 8/2002 | Onogi | F16H 61/66272 |
| | | | 474/69 |
| 2002/0183145 A1 * | 12/2002 | Blanchard | F16H 9/18 |
| | | | 474/19 |
| 2004/0063524 A1 * | 4/2004 | Zulawski | F16H 55/56 |
| | | | 474/19 |
| 2004/0089511 A1 * | 5/2004 | Bergman | F16H 55/56 |
| | | | 192/54.5 |
| 2004/0092345 A1 * | 5/2004 | Borghi | F16H 55/56 |
| | | | 474/19 |
| 2004/0102267 A1 | 5/2004 | Murakami et al. | |
| 2004/0142781 A1 * | 7/2004 | Huddleston | F16H 55/56 |
| | | | 474/19 |
| 2004/0229724 A1 * | 11/2004 | Kalies | F16H 55/56 |
| | | | 474/19 |
| 2004/0266570 A1 * | 12/2004 | Kalies | F16H 55/56 |
| | | | 474/19 |
| 2005/0043128 A1 * | 2/2005 | Zulawski | F16H 55/56 |
| | | | 474/19 |
| 2005/0096163 A1 * | 5/2005 | Gu | F16H 9/16 |
| | | | 474/10 |
| 2005/0202912 A1 | 9/2005 | Tay | |
| 2005/0239585 A1 * | 10/2005 | Nishida | F16H 9/18 |
| | | | 474/19 |
| 2005/0277502 A1 * | 12/2005 | Wood | F16H 9/20 |
| | | | 474/19 |
| 2007/0026981 A1 * | 2/2007 | Blanchard | F16H 55/56 |
| | | | 474/8 |
| 2007/0117664 A1 | 5/2007 | Shioiri et al. | |
| 2007/0270267 A1 * | 11/2007 | Miller | B62D 5/0409 |
| | | | 475/189 |
| 2008/0102998 A1 * | 5/2008 | Teijido | F16H 61/66272 |
| | | | 474/19 |
| 2009/0156338 A1 * | 6/2009 | Galletti | F16H 9/12 |
| | | | 474/19 |
| 2010/0240492 A1 | 9/2010 | Vyas et al. | |
| 2010/0317473 A1 | 12/2010 | Simon | |
| 2011/0053720 A1 | 3/2011 | Kang et al. | |
| 2012/0100944 A1 * | 4/2012 | Gu | F16H 9/18 |
| | | | 474/46 |
| 2013/0123065 A1 | 5/2013 | Bujold | |
| 2013/0244819 A1 * | 9/2013 | Eo | F16H 37/021 |
| | | | 474/39 |
| 2013/0331226 A1 | 12/2013 | Eo et al. | |
| 2014/0100078 A1 | 4/2014 | Tsukamoto et al. | |
| 2015/0011344 A1 * | 1/2015 | Ebihara | F16H 9/18 |
| | | | 474/8 |
| 2015/0018167 A1 | 1/2015 | Toyoda et al. | |
| 2015/0133257 A1 | 5/2015 | Uchino et al. | |

(56) References Cited

U.S. PATENT DOCUMENTS

| | | |
|---|---|---|
| 2015/0184728 A1 | 7/2015 | Mordukhovich |
| 2015/0337931 A1 | 11/2015 | Walter |
| 2015/0354676 A1 | 12/2015 | Versteyhe et al. |
| 2016/0076625 A1* | 3/2016 | Guiroult ............... F16H 37/027 474/8 |
| 2016/0102741 A1 | 4/2016 | Uchino et al. |
| 2016/0109000 A1 | 4/2016 | Uchino et al. |
| 2016/0169354 A1* | 6/2016 | Barendrecht ............ F16H 9/18 474/8 |
| 2016/0186841 A1* | 6/2016 | Ebihara .................... F16H 9/18 474/8 |
| 2016/0290457 A1 | 10/2016 | Walter |

FOREIGN PATENT DOCUMENTS

| | | |
|---|---|---|
| EP | 1-071-893 A1 | 1/2001 |
| JP | 58-038055 U | 3/1983 |
| JP | 60-026844 A | 2/1985 |
| JP | 05-296884 A | 11/1993 |
| JP | 08-233049 A | 9/1996 |
| JP | 2007-292140 A | 11/2007 |
| JP | 2008-051213 A | 3/2008 |
| JP | 2009-002414 A | 1/2009 |
| JP | 2010-053883 A | 3/2010 |
| KR | 10-2004-0020116 A | 3/2004 |

OTHER PUBLICATIONS

U.S. Office Action issued in co-pending U.S. Appl. No. 14/917,119 dated Jan. 22, 2018.
U.S. Notice of Allowance issued in co-pending U.S. Appl. No. 14/917,119 dated May 21, 2018.

* cited by examiner

TORQUE CAM DEVICE AND BELT-TYPE CONTINUOUSLY VARIABLE TRANSMISSION

TECHNICAL FIELD

This invention relates to a torque cam device, and a belt-type continuously variable transmission.

BACKGROUND ART

A torque cam device arranged to generate a torque in accordance with a difference of rotation phases of two cam member is used in various fields. One of these torque cam mechanisms is an end cam device which includes cam surfaces which are positioned at ends of two annular or cylindrical cam members, and which have, respectively, helical cam surfaces. In this end cam device, the two cam members are disposed coaxially with each other so that these cam surfaces are slidably abutted on each other. In this device, by providing the difference of the rotation phases to the two cam members, the two cam members are arranged to be moved to closer to or away from each other while the cam surfaces are slid on each other, so that the entire length (the axial length) is varied. Moreover, the force in the rotation axis direction (the thrust) is generated.

The thrust generated by this torque cam device is determined by the inclination angle $\alpha$ of the cam surface, an input toque T for providing the difference of the rotation phases, a radius R of the cam contacting portions (the entire length of the cam surfaces), and a frictional coefficient $\mu$ of the cam surfaces, as shown in a following equation (1) (cf. a patent document 1).

$$F=T/R/\tan(\alpha+\tan^{-1}\mu) \quad (1)$$

On the other hand, it is conceivable that the above-described torque cam device is used for a movement of a movable pulley of a belt-type continuously variable transmission mechanism for a vehicle (varying a winding radius of the belt), and for generating a clamping force (axial thrust of the pulley) for clamping the belt.

For example, FIG. 10 is a configuration view schematically showing a configuration which is invented in a process during which the present invention is devised, and in which the torque cam mechanism is applied to the belt-type continuously variable shift mechanism. As shown in FIG. 10, the belt-type continuously variable transmission includes a primary pulley 130P, a secondary pulley 130S, and a belt 137 wound around these pulleys 130P and 130S, and arranged to transmit the power. In this case, the torque cam mechanism 109 is provided to the secondary pulley 130S.

The secondary pulley 130S includes a fixed pulley 134 having an integral configuration with the rotation shaft 136, and a movable pulley 135 which is disposed coaxially with the fixed pulley 134, and which is arranged to be moved with respect to the fixed pulley 134 in the axial direction and in the rotation direction.

The torque cam mechanism 109 is an end cam. The torque cam mechanism 109 includes a drive cam member 191 disposed and fixed on a back surface of the movable pulley 135; a driven cam member 192 which is adjacent to the drive cam member 191, and which is disposed and fixed on a rotation shaft 136 of the fixed pulley 134; a cam surface 191a which is provided on one end surface of the drive cam member 191; a cam surface 192a which is provided on one end surface of the driven cam member 192; and a ball 193 which is disposed between portions between the both cam surfaces 191a and 192a. The torque cam mechanism 109 is constituted as a ball torque cam mechanism. The drive cam member 191 and the driven cam member 192 is formed into an annular shape or a cylindrical shape.

As shown in FIG. 11(a), these cam surfaces 191a and 192a are divided, respectively, into four of two drive cam surfaces (driving cam surfaces) 191d and 192d and two driven cam surfaces (coast cam surfaces) 191c and 192c. FIG. 11(b) is a side view showing a state in which the annular drive cam member 191 and the annular driven cam member 192 are deployed. As shown in FIG. 11(b), the drive cam surfaces 191d and 192d and the driven cam surfaces 191c and 192c are inclination surfaces which are inclined in different directions. The respective drive cam surfaces 191d and 192d are parallel to each other. The respective driven cam surfaces 191c and 192c are parallel to each other.

In this way, the drive cam member 191 and the driven cam member 192 have, respectively, two of the drive cam surfaces 191d and 192d, and two driven cam surfaces 191c and 192c. This is because the torque cam mechanism 109 is acted to the movable pulley 135 to be eccentric from the center of the rotation by one drive cam surface and one driven cam surface, so that the movable pulley 135 is inclined. Accordingly, there are equally provided two drive cam surfaces 191d and 192d and two driven cam surfaces 191c and 192c, so that the cam is not acted to the movable pulley 135 in the eccentric manner.

In the belt-type continuously variable transmission mechanism for the vehicle which is provided with this torque cam mechanism, when the input torque transmitted from the belt 137 to the secondary pulley 130S is increased, the belt clamping fore of the secondary pulley 130S becomes deficient. The fixed pulley 134 of the secondary pulley 130S is slipped with respect to the belt 137. Besides, the movable pulley 135 which can be rotated relative to the rotation shaft 136 follows the belt 137. Accordingly, the delay of the rotation phase of the fixed pulley 134 with respect to the movable pulley 135 is generated.

With this, the drive cam member 191 fixed to the movable pulley 135 is rotated relative to the driven cam member 192 fixed to the fixed pulley 134. The drive cam member 191 is moved from a state shown by a broken line in the rotation direction and in the axial direction as shown by a solid line of FIG. 11(b) while sliding the both drive cam surfaces 191d and 192 through the balls 193, so that the movable pulley 135 is moved closer to the fixed pulley 134. Consequently, the groove width of the V groove of the secondary pulley 130S is decreased, so that the belt clamping force is increased. Therefore, the slippage of the fixed pulley 134 is dissolved.

Conversely, in a state where the driving source acts the negative input torque (the braking torque), the delay of the rotation phase of the fixed pulley 134 is dissolved. When the belt clamping force of the secondary pulley 130S becomes deficient with respect to the negative input torque, the antecedence (precedence) of the fixed pulley 134 with respect to the movable pulley 135 is generated. In this case, the drive cam member 191 of the movable pulley 135 is delayed with respect to the driven cam member 192 of the fixed pulley 134. The drive cam member 191 is moved from a state shown by the broken line in the rotation direction and in the axial direction as shown by a two dot chain line of FIG. 11(b) while sliding the both driven cam surfaces 191c and 192c through the balls 193, so that the movable pulley 135 is moved closer to the fixed pulley 134. Consequently, the groove width of the V groove of the secondary pulley 130S is decreased, so that the belt clamping force is increased. Therefore, the slippage of the fixed pulley 134 is dissolved.

In the torque cam mechanism 109, it is desired to sufficiently ensure the thrust F generated by the torque cam mechanism so as to obtain the belt clamping force which has no trouble (is not interfered) with the torque transmission by the belt 137, and to sufficiently ensure the pulley slide amount S shown in FIG. 11(b).

As shown by the above-described equation (1), the generated thrust F is determined by the inclination angle α of the cam surface, the input torque T, the radius R of the cam contact portions, and the frictional coefficient μ of the cam surfaces. The input torque T is varied by the running condition of the vehicle, and the condition of the road. The input torque T is not operated in the same way. For further increasing the generated thrust F, it is efficient to decrease the inclination angle α of the cam surfaces (cf. FIG. 11(b)), and to decrease the frictional coefficient μ of the cam contacting portions, and to increase the radius R of the cam contacting portions.

In a case where the inclination angle α of the cam surface is decreased, it is necessary to increase the circumferential length of the cam surface for ensuring the pulley stroke amount necessary for the shift. Accordingly, the radius R of the cam contacting portions is increased. If the radius R of the cam contacting portions is increased, it is possible to further increase the generated thrust F. However, it is necessary that the drive cam surface and the driven cam surface are received between the pulley shafts. The distance of the radius R is limited. The inclination angle of the cam surface is limited. Therefore, the decrease of the inclination angle α is limited.

Moreover, it is effective to decrease the frictional coefficient of the cam contacting portion. However, the contacting itself has a mechanical properties. This is limited.

Accordingly, the use of the end cam such as the torque cam mechanism 109 is limited to the scooter and the small vehicle such as the light car which have the driving source having the small torque. Alternatively, the use of the end cam such as the torque cam mechanism 109 is limited to the use together with the general method of operating the movable pulley by using the hydraulic pressure. Accordingly, it is requested to develop the torque cam device which can use in the vehicle having the driving source having the larger torque without using together with the hydraulic method and so on.

PRIOR ART DOCUMENT

Patent Document

Patent Document 1: Japanese Patent Application Publication No. 5-296884

SUMMARY OF THE INVENTION

It is, therefore, an object of the present invention to provide a torque cam device and a belt-type continuously variable transmission using this which are devised to solve the above-described problems, and which is arranged to sufficiently ensure generated thrust, and to sufficiently ensure a pulley sliding amount in the belt-type continuously variable transmission.

For attaining the above-described problems, a torque cam device according to the present invention comprises: a drive cam member which includes a first drive cam surface which has an annular shape, and which is arranged to be rotated by receiving a rotation torque; a driven cam member which include a first driven cam surface that has an annular shape, and that confronts the first drive cam surface, and which is arranged to be driven to be rotated by the drive cam member; and an intermediate cam member which includes a second drive cam surface that is formed on one end of the intermediate cam member, and that is arranged to be abutted on the first drive cam surface, a second driven cam surface that is formed on the other end of the intermediate cam member, and that is arranged to be abutted on the first driven cam surface, and which is arranged to be rotated relative to the driven cam member and the driven cam member, the first driven cam surface and the second drive cam surface being abutted on each other when a power is transmitted from the drive cam member to the driven cam member, the first driven cam surface and the second driven cam surface being abutted on each other when the power is transmitted from the driven cam member to the drive cam member.

It is preferable that each of the first drive cam surface, the first driven cam surface, the second drive cam surface, and the second driven cam surface has an annular entire circumference which is equally divided into two, and which is a helical curve according to an angle of the cam; stepped connection surfaces are formed on portions between the equally divided helical surfaces; when the power is transmitted from the drive cam member to the driven cam member, the connection surface of the first driven cam surface and the connection surface of the second driven cam surface are abutted on each other, and when the power is transmitted from the driven cam member to the drive cam member, the connection surface of the first drive cam surface and the connection surface of the second drive cam surface are abutted on each other.

It is preferable that the second drive cam surfaces and the connection portions of the portions between the second drive cam surface, and the second driven cam surfaces and the connection portions between the portions of the second driven cam surfaces are disposed to have a phase shift.

It is preferable that the connection surfaces are formed, respectively, in directions along a rotation axial line.

It is preferable that the first drive cam surface, the first driven cam surface, the second drive cam surface, and the second driven cam surface has an identical cam angle.

It is preferable that each of the first drive cam surface, the first driven cam surface, the second drive cam surface, and the second driven cam surface includes a groove formed in a direction in which each of the annular shapes extends, and a ball disposed to be rolled on the groove; and the respective cam surfaces are abutted through the ball.

A belt-type continuously variable transmission device according to the present invention comprises: two pulley devices each including a fixed pulley and a movable pulley; and a belt wound around the two pulley devices to transmit a power, the torque cam device which is claimed in one of claims 1 to 6, and which is arranged to generate a clamping force to one of the two pulley devices.

It is preferable that in the torque cam device, the drive cam member and the movable pulley rotate as a unit; the driven cam member and the fixed pulley rotate as a unit; the intermediate cam member is disposed to be rotated relative to the rotation shaft of the pulley device.

In the torque cam device according to the present invention, when the power is transmitted from the drive cam member to the driven cam member, the first drive cam surface and the second drive cam surface are abutted on each other. When the power is transmitted from the driven cam member to the drive cam member, the first driven cam surface and the second driven cam surface are abutted on each other. The first drive cam surface, the second drive cam surface, the first driven cam surface, and the second driven cam surface which have the annular shape are formed, respectively, in the entire annular circumferences. It is possible to ensure the length of the cam surface by the length of the entire circumference.

In a case where the torque cam device is constituted without using the intermediate cam, the drive cam surface and the driven cam surface can only ensure the length of the cam surface only by the half of eh entire circumference of the annular shape. In the present invention, it is possible to substantially double the length of the cam surface. Accordingly, it is possible to decrease the inclination angle of the cam surface while the radius of the cam contacting portion is within the range between the pulley shafts and the pulley stroke is ensured, and thereby to increase the generated thrust.

BRIEF DESCRIPTION OF DRAWINGS

FIG. 3(a) shows a CVT low mode. FIG. 3(b) shows a CVT high mode. FIG. 3(c) shows a direct connection mode.

FIG. 6A shows an intermediate cam member. FIG. 6B shows a drive cam member and a driven cam member.

FIG. 7(a) shows a state where the phases of the respective cam members correspond to each other. FIG. 7(b) shows a state where a phase of the drive cam member is anteceded. FIG. 7(c) shows a state where the phase of the drive cam member is delayed.

FIGS. 8(a) to (c) show a process by which the phase of the drive cam member of the torque cam device according to the one embodiment is anteceded in this order. FIG. 8(d) shows a comparative example.

FIG. 9(a) shows a cam member of the comparative example. FIG. 9(b) shows the cam member of the torque cam device according to the one embodiment.

FIG. 11(a) is a front view of a cam surface of the cam member. FIG. 11(b) is a circumferential view of the cam member.

DESCRIPTION OF EMBODIMENTS

Hereinafter, one embodiment of a torque cam device and a belt-type continuously variable transmission using the torque cam device which are according to the present invention is illustrated with reference to the drawings. Besides, the below-described embodiment are merely example. It is not intended to exclude various variations and applications of the art which are not described in the below-described embodiment. It is possible to implement by using a part of the embodiment, to implement by varying a part of the embodiment, and to implement by displacing other mechanisms and other devices having identical functions.

The electric vehicle according to the present invention (hereinafter, referred to merely as a vehicle) is an electric vehicle (called also as EV) which runs to use only an electric motor as a driving source. The electric vehicle according to the present invention does not include a hybrid vehicle which runs by selectively using the electric motor and an internal combustion engine as a driving source. Moreover, the present automatic transmission is disposed between the electric motor and driving wheels of the thus-constructed vehicle.

[Configuration of Driving System Unit]

Figure 1:
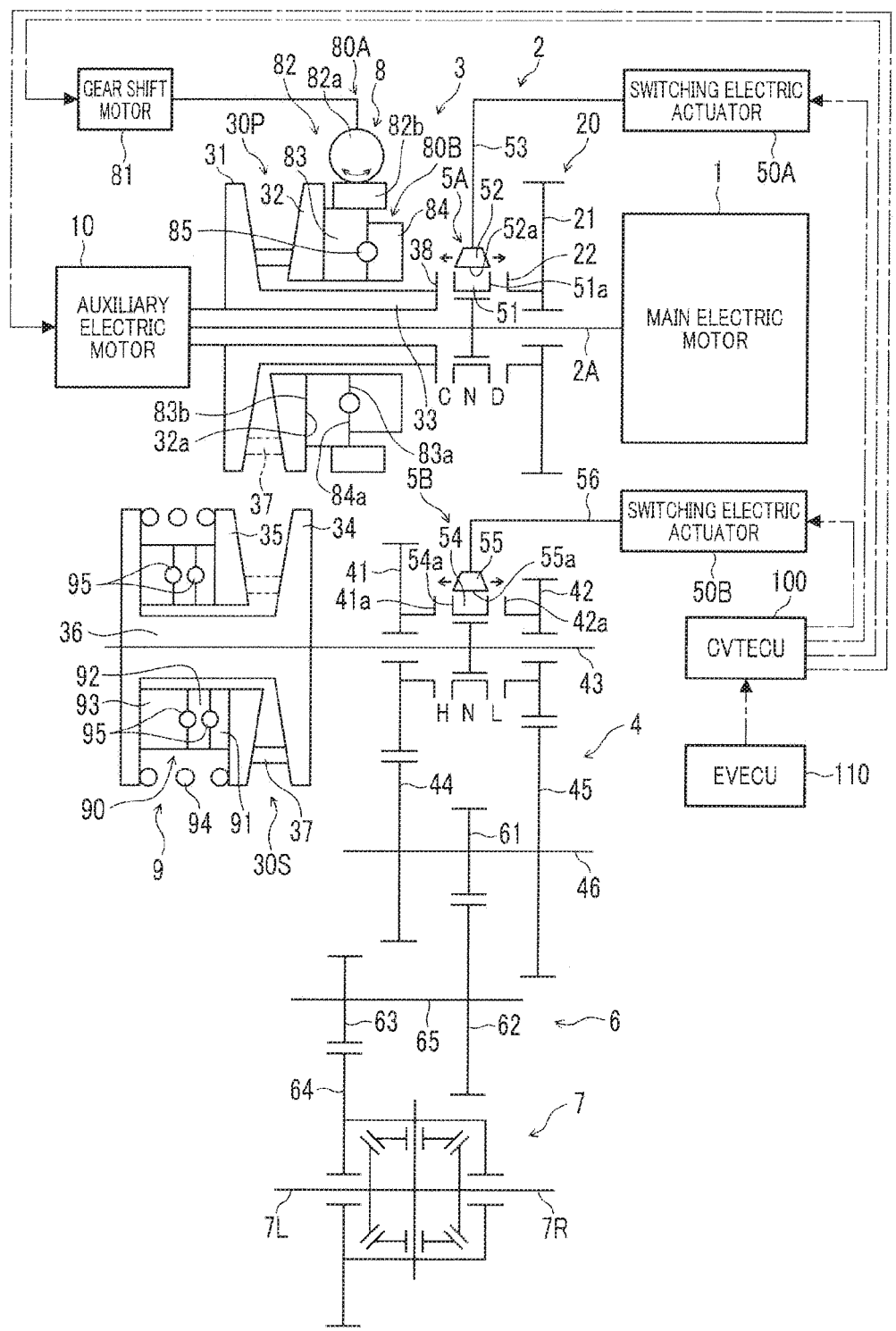
FIG. 1 is a configuration view showing a main part of a driving system unit of a vehicle which is provided with an automatic transmission according to one embodiment.
Figure 2:
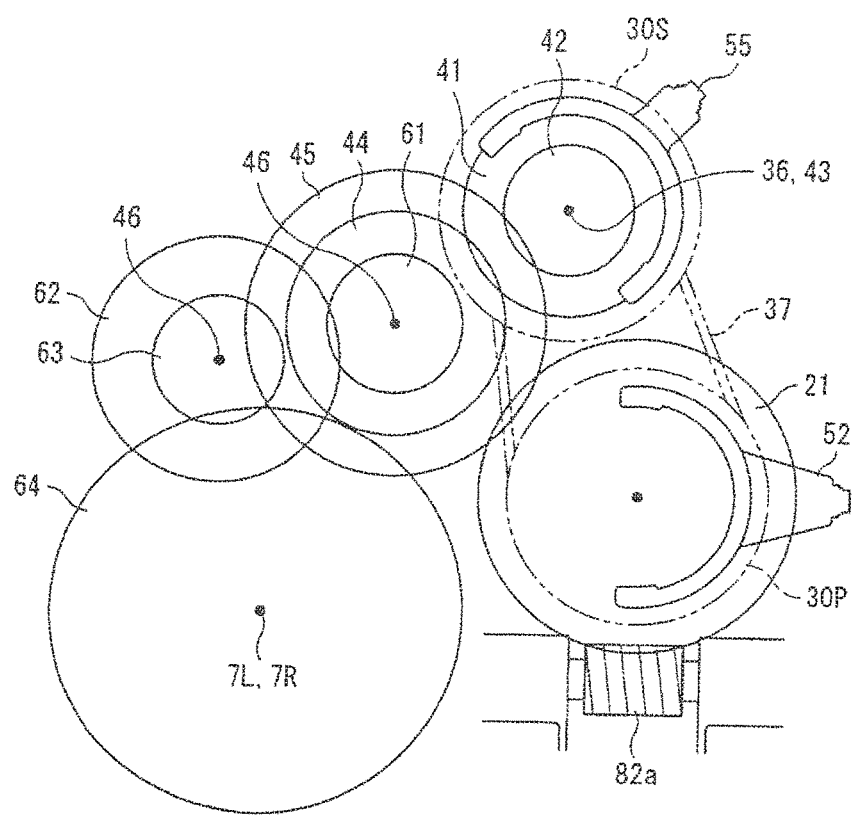
FIG. 2 is an axial disposition view showing the main part of the driving system unit of the vehicle which is provided with automatic transmission according to the one embodiment.

First, a driving system unit of the vehicle is illustrated. As shown in FIG. 1 and FIG. 2, this driving system unit includes a main electric motor (called merely also as an electric motor) 1 which is a driving source of the vehicle; an automatic transmission 2 including a transmission input shaft (hereinafter, referred to as an input shaft) 2A which is integrally connected to an output shaft of the main electric motor 1; a speed reduction mechanism 6 connected to the automatic transmission 2; and a differential mechanism 7 connected to the speed reduction mechanism 6. Wheel shafts 7L and 7R are connected to left and right side gears of the differential mechanism 7. Driving wheels (not shown) are connected, respectively, to the wheel shafts 7L and 7R.

The automatic transmission 2 is a transmission which is constituted by adding a direct connection gear mechanism 20 to a belt type continuously variable transmission mechanism (CVT) with an auxiliary transmission mechanism. The automatic transmission 2 includes a belt 37 for transmitting a power. Moreover, the automatic transmission 2 includes a belt type continuously variable transmission mechanism (hereinafter, referred to also as a variator) 3 which includes a primary pulley (input portion) 30P that is disposed to be rotated relative to the input shaft 2A; a constantly meshed parallel shaft type gear transmission mechanism (hereinafter, referred to also as the auxiliary transmission mechanism) 4 which is connected to a rotation shaft 36 of a secondary pulley (output portion) 30S of this variator 3; and the direct connection gear mechanism 20 which is arranged to directly connect the input shaft 2A and the speed reduction mechanism 6 to avoid the variator 3 and the auxiliary transmission mechanism 4.

The variator 3 includes the primary pulley 30P including a fixed pulley 31 including a rotation shaft 33, and the movable pulley 32; a secondary pulley 30S including a fixed pulley 34 including the rotation shaft (output shaft) 36, and a movable pulley 35; and a belt 37 which is wound around V grooves of the primary pulley 30P and the secondary pulley 30S. The rotation shaft 33 of the fixed pulley 31 of the primary pulley 30P is disposed to be rotated relative to the input shaft 2A.

Besides, FIG. 1 shows the primary pulley (the pulley device) 30P, the secondary pulley (the pulley device) 30S, and the belt 37 of the variator 3 in a state where a transmission gear ratio is a low side and a high side. The state of the low side is shown in half portions of respective outer sides (on a side on which the pulleys are apart from each other) of the primary pulley 30P and the secondary pulley 30S. The high side state is shown in half portions of respective inner sides (on a side on which the pulleys are near each other) of the primary pulley 30P and the secondary pulley 30S. The state of the low side of the belt 37 is schematically shown by a solid line. The state of the high side of the belt 37 is shown schematically shown by a two dot chain line. Besides, the high state shown by the two dot chain line shows only a position relationship of the radial direction of the pulley and the belt. An actual belt position does not appears in the half portion of the inner side of the pulley.

An electric actuator and a mechanical reaction force mechanism perform an adjustment of the transmission gear ratio, and an adjustment of a pulley thrust (referred to merely as a thrust), that is, an adjustment of a belt clamping force, by varying belt winding radii of the primary pulley 30P and the secondary pulley 30S of this variator 3. A torque cam mechanism is used as the mechanical reaction force mechanism. This torque cam mechanism is constituted by a pair of cam members which have annular shapes, and which have cam surfaces that are positioned at end portions, and that are inclined in spiral (helical) shapes. These torque cam mechanisms are disposed so that the respective cam surfaces are slidably abutted on each other in a coaxial manner. The pair of the cam members are arranged to be moved closer to or away from each other in the axial direction in accordance with the relative rotation of the pair of the cam members, so that an entire length of the pair of the cam members is varied. With this, the torque cam mechanism is arranged to adjust the thrust of the rotation member (pulleys 30P and 30S) which are pressed abutted on one of the cam members.

In this case, the torque cam mechanisms are used as the mechanical reaction force mechanism in both of the primary pulley 30P and the secondary pulley 30S. With this, the ball torque cam mechanisms of the both pulleys are acted as the reaction forces of the forces which are generated by the belt 37 to push the primary pulley 30P and the secondary pulley 30S (the force that separates the pulleys). With this, the thrust according to the transmitting torques of the belt 37 are generated in the both pulleys 30P and 30S without using hydraulic pressure and so on.

Moreover, the primary pulley 30P is provided with an electric actuator 80A which actively drives to rotate one of the pair of the cam members. The primary pulley 30P is constituted so as to adjust the groove width of the V groove of the primary pulley 30P by varying the entire length of the pair of the cam members. Besides, in this embodiment, the respective torque cam mechanism employ ball torque cam mechanisms in which slidably abutting portions of the respective cam surfaces are point contacts through the balls.

In this way, the primary pulley 30P is arranged to vary the entire length of the pair of the cam members by the torque cam mechanism which is the mechanical reaction force mechanism, and the electric actuator 80A arranged to drive to rotate one of the pair of the cam members. With this, the primary pulley 30P is arranged to adjust the groove width of the V groove of the primary pulley 30P, and thereby to adjust the transmission gear ratio. Moreover, the primary pulley 30P is arranged to adjust the belt clamping force by adjusting the thrust of the pulley 30P. Accordingly, the mechanism constituted by the electric actuator and the torque cam mechanism of the primary pulley 30P is also referred to as a shift mechanism 8. On the other hand, the torque cam mechanism of the secondary pulley 30S is also referred to as a thrust generating mechanism 9 since the torque cam mechanism of the secondary pulley 30S generates the thrust of the secondary pulley 30s. Details of these shift mechanism 8 and the thrust generating mechanism 9 will be illustrated later.

The auxiliary transmission mechanism 4 has a plurality of gear stages (shift stages) (in this case, two stages of the High and the Low). The auxiliary transmission mechanism 4 includes gears 41 and 42 which are provided to be rotated relative to a rotation shaft 43 is which is integral coaxially with the rotation shaft 36 of the secondary pulley 30S of the variator 3; and gears 44 and 45 which are disposed and fixed on a rotation shaft 46 parallel to the rotation shaft 43 so as to rotate as a unit with the rotation shaft 46. The gear 41 and the gear 44 are constantly engaged with each other. The gear 41 and the gear 44 constitute a second speed (High) gear stage. The gear 42 and the gear 45 are constantly engaged with each other. The gear 42 and the gear 45 constitute a first speed (Low) gear stage.

The auxiliary transmission mechanism 4 is provided with an engagement clutch mechanism 5B of three position type which is arranged to selectively switch the second speed gear stage and the first speed gear stage. The engagement clutch mechanism 5B includes a clutch hub 54 arranged to rotate as a unit with the rotation shaft 43; a sleeve 55 having an internal teeth 55a which is spline-engaged with an external teeth 54a provided to the clutch hub 54; a shift folk 56 arranged to move the sleeve 55 in a shift direction (an axial direction); and a switching electric actuator 50B which is arranged to drive the shift folk 56.

The gear 41 is provided with an external teeth 41a arranged to be engaged with the internal teeth 55a of the sleeve 55. The gear 42 is provided with an external teeth 42a arranged to be engaged with the internal teeth 55a of the sleeve 55.

The sleeve 55 has respective positions of a neutral position (N), a second speed position (H) setting the second speed (High) gear stage, and a first speed position (L) setting the first speed (Low) gear stage. The sleeve 55 is driven to be slid among the respective positions by the shift folk 56.

By moving the sleeve 55 toward the gear 41's side (that is, the second speed position) by driving the shift folk 56 by the switching electric actuator 50B, the internal teeth 55a of the sleeve 55 is engaged with the external teeth 41a of the gear 41. With this, the rotation shaft 43 and the gear 41 rotate as a unit with each other, so that the second speed gear stage is set. When the second speed gear stage is set, the power is transmitted from the rotation shaft 36 of the secondary pulley 30S of the variator 3 (that is, the rotation shaft 43) through the gear 41, the gear 44, and the rotation shaft 46 to the speed reduction mechanism 6.

By moving the sleeve 55 toward the gear 42's side (that is, the first speed position) by driving the shift folk 56 by the switching electric actuator 50B, the internal teeth 55a of the sleeve 55 is engaged with the external teeth 42a of the gear 42. With this, the rotation shaft 43 and the gear 42 rotate as a unit with each other, so that the first speed gear stage is set. When the first speed gear stage is set, the power is transmitted from the rotation shaft 36 of the secondary pulley 30S of the variator 3 (that is, the rotation shaft 43) through the gear 42, the gear 45, and the rotation shaft 46 to the speed reduction mechanism 6.

Besides, a rotation synchronous control is performed by using the main electric motor 1 for smoothly engaging the internal teeth 55*a* of the sleeve 55 with the external teeth 41*a* of the gear 41 and the external teeth 42*a* of the gear 42. With this, a synchronous mechanism is not needed at an engaging portion. There is not provided the synchronous mechanism.

The direct connection gear mechanism 20 includes an input gear (an input gear) 21 disposed to be rotated relative to the input shaft 2A. As shown in FIG. 2, this input gear 21 is engaged and drivingly connected with one of the plurality of the shift gears of the auxiliary transmission mechanism (in this case, the gear 45 which is the output side gear of the first speed stage).

Besides, teeth numbers of the input gear 21 and the gear 45 are set substantially identical to each other so that the transmission gear ratio becomes substantially 1.0.

For selectively using this direct connection gear mechanism 20 and the variator 3, there is provided an engaging (meshing) clutch mechanism 5A of 3 position type. As shown in FIG. 1, the engaging clutch mechanism 5A has a configuration identical to the engaging clutch mechanism 5B. The engaging clutch mechanism 5A includes a clutch hub 51 arranged to rotate as a unit with the input shaft 2A; a sleeve 52 including an internal teeth 52*a* which is spline-engaged with an external teeth 51*a* provided to the clutch hub 51; a shift folk 53 arranged to move the sleeve 52 in a shift direction (an axial direction); and a switching electric actuator 50A arranged to drive the shift folk 53.

The input gear 21 is provided with an external teeth 22 arranged to be engaged with the internal teeth 52*a* of the sleeve 52. The rotation shaft 33 of the fixed pulley 31 of the primary pulley 30P of the variator 3 is provided with an external teeth 38 which is arranged to be engaged with the internal teeth 52*a* of the sleeve 52.

The sleeve 52 has respective positions of a neutral position (N), a CVT position (C) setting a power transmitting path passing through the variator 3, and a direct connection position (D) setting the power transmitting path passing through the direct connection gear mechanism 20. The sleeve 52 is driven to be slid among the respective positions by the shift folk 53.

By moving the sleeve 52 toward the rotation shaft 33's side by driving the shift folk 53 by the switching electric actuator 50A, the internal teeth 52*a* of the sleeve 52 is engaged with the external teeth 38 of the rotation shaft 33. With this, the input shaft 2A and the fixed pulley 31 of the primary pulley 30P rotate as a unit with each other, so that the power transmitting path passing through the variator 3 is set.

By moving the sleeve 52 toward the input gear 21's side by driving the shift folk 53 by the switching electric actuator 50A, the internal teeth 52*a* of the sleeve 52 is engaged with the external teeth 22 of the input gear 21. The input shaft 2A and the input gear 21 rotate as a unit with each other, so that the power transmitting path passing through the direct connection gear mechanism 20 is set.

In this case, a rotation synchronous control described later is performed by using the main electric motor 1 for smoothly engaging the internal teeth 52*a* of the sleeve 52 with the external teeth 38 of the rotation shaft 33 and the external teeth 22 of the input gear 2. With this, the synchronous mechanism is not needed at an engaging portion. There is not provided the synchronous mechanism.

Besides, in this embodiment, the both engaging clutch mechanisms 5A and 5B are not provided with the synchronous mechanism since the synchronous rotation control is performed as described above. However, in a case where there is provided the synchronous mechanism, it is possible to obtain an effect to further promote the synchronism. Moreover, in a case where the rotation synchronism control is not performed, the synchronous mechanism is needed.

The speed reduction mechanism 6 includes a gear 61 disposed and fixed on the rotation shaft 46 of the auxiliary transmission mechanism 4 to rotate as a unit with the rotation shaft 46 of the auxiliary transmission mechanism 4; a gear 62 which is disposed and fixed on a rotation shaft 65 that is parallel to the rotation shaft 46 to rotate as a unit with the rotation shaft 65, and which is engaged with the gear 61; a gear 63 disposed and fixed on the rotation shaft 65 to rotate as a unit with the rotation shaft 65; and a gear 64 which is an input gear of the differential mechanism 7, and which is engaged with the gear 63. The speed is reduced between the gear 61 and the gear 62 in accordance with that gear ratio. Moreover, the speed is reduced between the gear 63 and the gear 64 in accordance with that gear ratio.

[Thrust Generating Mechanism (Mechanical Reaction Force Mechanism)]

Hereinafter, a thrust generating mechanism 9 which is one of the mechanical reaction force generating mechanisms, and which is provided to the secondary pulley 30S is illustrated. As described above, this thrust generating mechanism 9 employs the torque cam mechanism. The employed torque cam mechanism (the torque cam device) 90 is illustrated with reference to FIG. 5 to FIG. 9.

Figure 5:
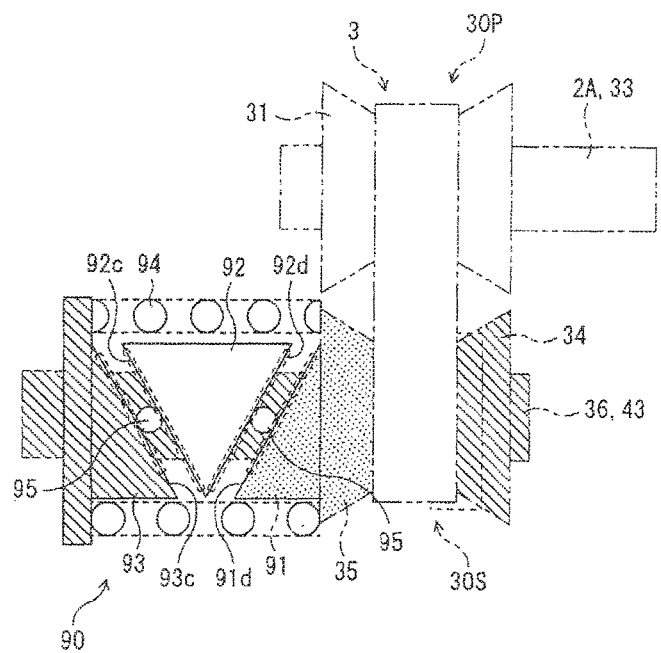
FIG. 5 is an schematic configuration view for illustrating a torque cam device according to the one embodiment.

As shown in FIG. 5, the torque cam mechanism 90 is an end cam. The torque cam mechanism 90 includes three cam members of a drive cam member 91 which is disposed and fixed on a back surface of the movable pulley 35; a driven cam member 93 which is disposed and fixed on the rotation shaft 36 of the fixed pulley 34, and which is adjacent to the drive cam member 91; and an intermediate (middle) cam member 92 which is disposed between the drive cam member 91 and the driven cam member 93, which is disposed coaxially with the drive cam member 91 and the driven cam member 93, and which is arranged to be rotated relative to the cam members 91 and 93. The drive cam member 91 drives the driven cam member 93 at the drive running (the drive travel) of the vehicle. The driven cam member 93 drives the drive cam member 91 at the coast running (the driven running, or the driven travel) of the vehicle.

Figure 6:
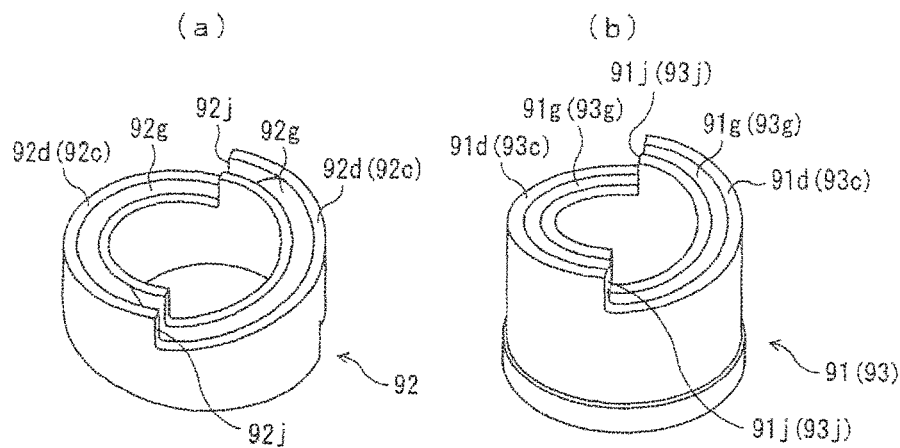
FIG. 6 are perspective views showing cam members of the torque cam device according to the one embodiment.
Figure 7:
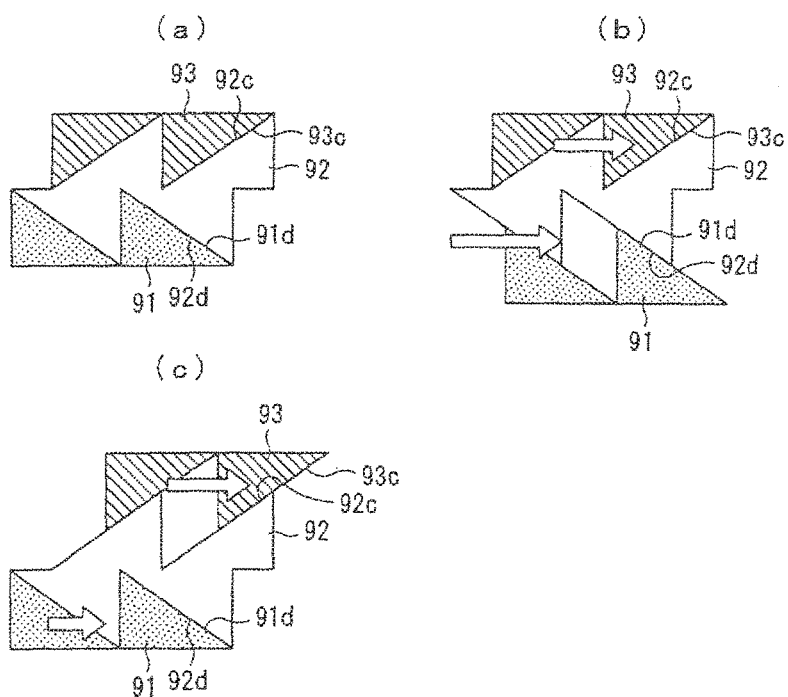
FIG. 7 are schematic circumferential views for illustrating actuation of the torque cam device according to the one embodiment.
Figure 8:
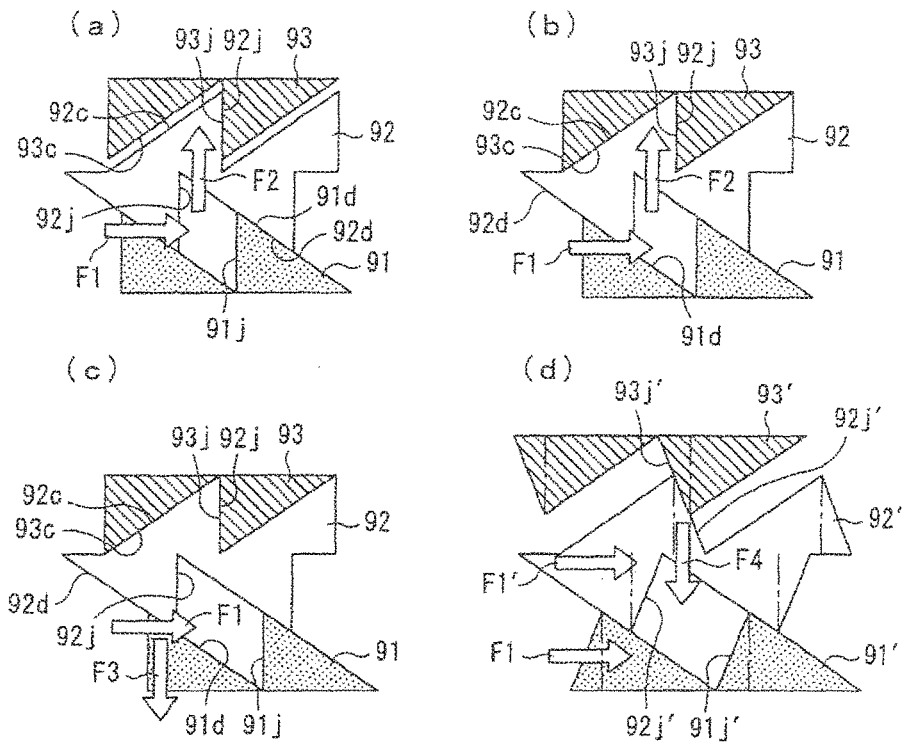
FIG. 8 are schematic circumferential views for illustrating effects of the torque cam device according to the one embodiment.
Figure 9:
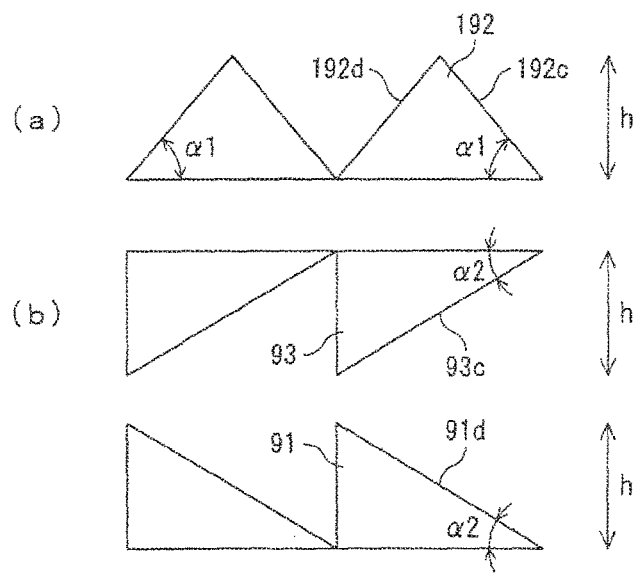
FIG. 9 are schematic circumferential views for illustrating effects of the torque cam device according to the one embodiment.
Figure 10:
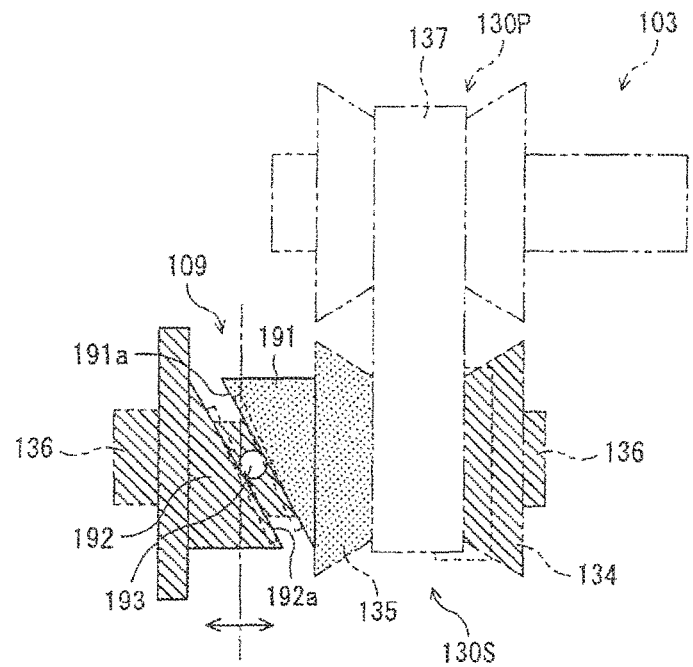
FIG. 10 is a schematic configuration view for illustrating the torque cam device relating to problems of the present invention.
Figure 11:
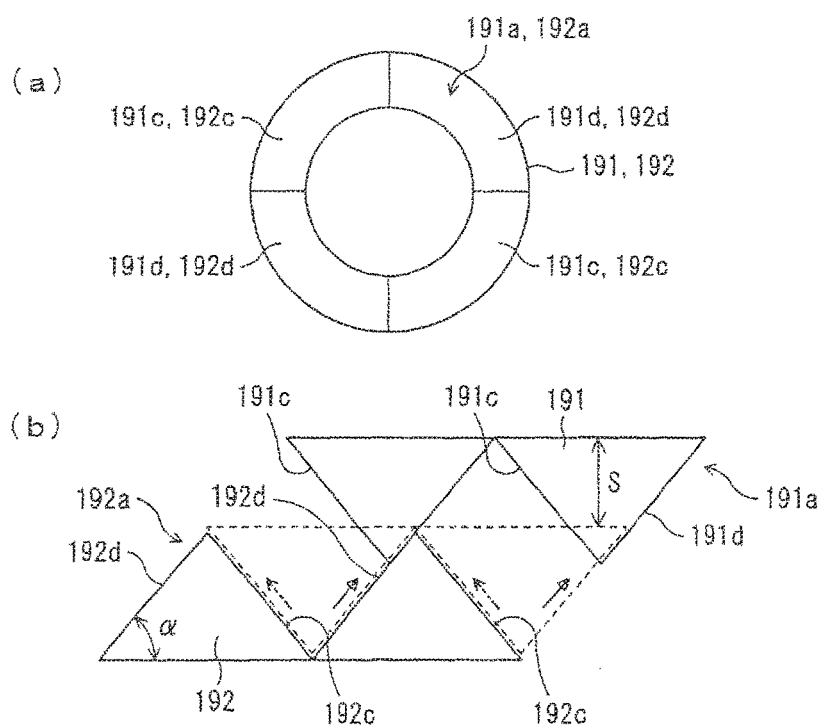
FIG. 11 are schematic views for illustrating cam surfaces of the torque cam device relating to the problems of the present invention.

As shown in a perspective view of FIG. 6(*b*), the drive cam member 91 is a cylindrical (or annular) member. The drive cam member 91 includes a first drive cam surface 91*d* which has an annular shape, and which is positioned on one end side; and the other end side which is disposed and fixed on the back surface of the movable pulley 35. The entire annular portion of the annular first cam surface 91*d* is equally divided into two pieces. The respective two pieces have helical curve surfaces according to predetermined cam angles. Connection surfaces 91*j* each having a stepped shape are formed, respectively, on portions between the two equally divided first drive cam surfaces 91*d*. Each of the connection surfaces 91*j* is formed in a direction along the rotation axial line of the drive cam member 91 (in a direction parallel to the rotation axial line).

The driven cam member 93 has a shape which is symmetrical to the drive cam member 91, and which is obtained by inversing (reversing) the perspective view of FIG. 6(*b*). It is illustrated by using the perspective view of FIG. 6(*b*). The driven cam member 93 includes a first driven cam surface 93c formed on one end side of the driven cam member 93, and the other end side fixed on the rotation shaft 36. The entire annular circumference of the annular first driven cam surface 93c is equally divided into two. These are respectively constituted by helical curved surfaces according to predetermined cam angles. Stepped connection surfaces 93j are formed on portions between the two equally divided first driven cam surfaces 93c. These connection surfaces 93j are formed, respectively, in a direction along the rotation axial lines of the driven cam members 93 (in a direction parallel to the rotation axial lines). These connection surfaces 93j are also formed, respectively, in directions along the rotation axial line of the driven cam member 93 (in the direction parallel to the rotation axial lines).

As shown in the perspective view of FIG. 6(a), the intermediate cam member 92 is a cylindrical (or annular) member. The intermediate cam member 92 includes a second drive cam surface 92d which has an annular shape, which is positioned on one end side, and which confronts the first drive cam surface 91d; and a second driven cam surface 92c which has an annular shape, which is positioned on the other end side, and which confronts the first driven cam surface 93c. As shown in FIG. 6(a), the entire annular circumference of the annular second drive cam surface 92d is divided into two. These are respectively constituted by helical curved surfaces according to predetermined cam angles. Stepped connection surfaces 92j are formed, respectively, on portions between the equally divided two first drive cam surfaces 92d. These connection surfaces 92j are also formed, respectively, in the direction along the rotation axial line of the intermediate cam member 92 (in the direction parallel to the rotation axial line).

The annular second driven cam surface 92c has a shape which is symmetrical to the second drive cam surface 92d, and which is obtained by inversing (reversing) the perspective view of FIG. 6(a). The entire annular circumference of the second driven cam surface 92c is equally divided into two. These are respectively constituted by helical curved surfaces according to predetermined cam angles. Stepped connection surfaces 92j are respectively formed on portions between the two equally divided first driven cam surfaces 92c. These connection surfaces 92j are also formed in the direction along the rotation axial line of the intermediate cam member 92 (in the direction parallel to the rotation axial line).

Accordingly, if the respective curved helical surfaces of the first drive cam surface 91d and the second drive cam surface 92d are the right screw helical(s), the respective curved helical surfaces of the first driven cam surface 93c and the second driven cam surface 92c are left screw helical(s).

The second drive cam surface 92d and the second driven cam surface 92c of the intermediate cam member 92 are formed to have phase shift in the rotational direction. That is, the second drive cam surface 92d and the second driven cam surface 92c of the intermediate cam member 92 are formed so that the connection surfaces 92j connecting the two second drive cam surfaces 92d, and the connection surfaces 92j connecting the two second drive cam surfaces 92c are disposed and formed to shift the phase in the rotational direction. The phase shift of the cam surfaces 92d and 92c can be set to at most 90 degrees. With this, it is possible to decrease the axial length of the intermediate cam member 92.

In this case, the respective cam surfaces 91d, 93c, 92d, and 92c have identical cam angles.

The second drive cam surface 92d of the intermediate cam member 92 is arranged to be abutted on the first drive cam surface 91d of the drive cam member 91. The second driven cam surface 92c of the intermediate cam member 92 is arranged to be abutted on the first driven cam surface 93c of the driven cam member 93. Besides, balls (steel balls) 95 are disposed, respectively, between the both drive cam surfaces 91d and 92d, and between the both driven cam surfaces 93c and 92c. The torque cam mechanism 90 is constituted as a ball torque cam device.

Accordingly, the first drive cam surface 91d of the drive cam member 91, the second drive cam surface 92d and the second driven cam surface 92c of the intermediate cam member 92, and the first driven cam surface 93c of the driven cam member 93 include, respectively, grooves 91g, 92g, and 93 receiving the balls 95. With this, portions between the respective drive cam surfaces 91d and 92d, between the driven cam surfaces 93c and 92c are smoothly slid by point contacts by the balls 95.

Operation mechanisms of this torque cam mechanism 90 are illustrated in detail.

In a case where the drive cam member 91 and the driven cam member 93 do not have the phase shift, the first drive cam surface 91d of the drive cam member 91 and the second drive cam surface 92d of the intermediate cam member 92 are meshed with each other, and the first driven cam surface 93c of the driven cam member 93 and the second driven cam surface 92c of the intermediate cam member 92 are meshed with each other. With this, the total axial length of the drive cam member 91, the intermediate cam member 92, and the driven cam member 93, that is, the total length of the torque cam mechanism 90 becomes minimum. In this case, the groove width of the V groove of the secondary pulley 30S becomes maximum, so that the transmission gear ratio of the variator 3 becomes highest.

In the variator 3, when the input torque transmitted from the belt 37 to the secondary pulley 30S is increased at the drive running of the vehicle, the belt clamping force of the secondary pulley 30S becomes deficient, so that the fixed pulley 34 is slid with respect to the belt 37. Besides, the movable pulley 35 arranged to be rotated relative to the rotation shaft 36 is moved to follow the belt 37. Accordingly, the phase delay of the fixed pulley 34 with respect to the movable pulley 35 is generated.

In this case, the drive cam member 91 fixed to the movable pulley 35 is relatively rotated (relative to the intermediate cam member 92 and the driven cam member 93 fixed to the fixed pulley 34) to antecede (precede) the intermediate cam member 92 and the driven cam member 93 fixed to the fixed pulley 34 while sliding the portions between the drive cam surfaces 91d and 92d through the balls 95, as shown FIG. 7(b), and moved to be separated from the driven cam member 93 and the intermediate cam member 92 in the axial direction so that the movable pulley 35 is moved closer to the fixed pulley 34. Consequently, the groove width of the V groove of the secondary pulley 30S is decreased, so that the thrust of the pulley 30S is increased. Therefore, the belt clamping force is increased, so that the slippage of the fixed pulley 34 is dissolved.

Contrarily to this, in a state where the driving source operates (generates) a negative input torque (braking torque) at the coast running of the vehicle, the delay of the rotation phase of the fixed pulley 34 is dissolved. When the belt clamping force of the secondary pulley 30S becomes deficient with respect to the negative input force, the antecedence (precedence) of the rotational phase of the fixed pulley 34 with respect to the movable pulley 35 is generated (conversely, the delay of the rotational phase of the movable pulley 35 with respect to the fixed pulley 34 is generated).

In this case, the driven cam member 93 fixed to the fixed pulley 34 is relatively rotated to antecede (precede) the intermediate cam member 92 and the drive cam member 91 fixed to the movable pulley 35 while sliding the portions between the driven cam surfaces 93c and 92c through the balls 95, as shown in FIG. 7(c), and moved to be separated from the drive cam member 91 and the intermediate cam member 92 in the axial direction so that the movable pulley 35 is moved closer to the fixed pulley 34. With this, the groove width of the V groove of the secondary pulley 30S is decreased, so that the thrust of the pulley 30S is increased. Accordingly, the belt clamping force is increased, so that the slippage of the fixed pulley 34 is dissolved.

Besides, the driving torque and the braking torque are not acted, at the stop and so on of the vehicle. Accordingly, the thrust of the pulley by the torque cam mechanism 90 is not added. Accordingly, there is provided a coil spring 94 arranged to urge the movable pulley 35 in a direction to be closer to the fixed pulley 34, so as to prevent the belt slippage and to surely clamp the belt 37 in the initial driving state such as the start of the vehicle.

[Shift Mechanism]

As shown in FIG. 1, the shift mechanism 8 provided to the primary pulley 30P is constituted by the electric actuator 80A and the mechanical reaction force mechanism 80B. In this embodiment, the torque cam mechanism is employed as the mechanical reaction force mechanism 80B.

The torque cam mechanism employed in the mechanical reaction force mechanism 80B is disposed behind the movable pulley 32 of the primary pulley 30P. The torque cam mechanism includes a pair of cam members 83 and 84 coaxially disposed on the rotation shaft 33. The cam members 83 and 84 include, respectively, spiral cam surfaces 83a and 84a which are inclined with respect to a direction perpendicular to the rotation shaft 33. The pair of the cam members 83 and 84 are disposed so that the respective cam surfaces 83a and 84a are abutted on each other. Besides, in this case, the torque cam mechanism employs the ball torque cam mechanism in which balls (steel balls 85) is disposed between the cam surfaces 83a and 84a that are slidably abutted on each other, and in which the slidably abutting portions are the point contacts by the balls 85. The cam surfaces 83a and 84a are smoothly slid with each other.

The cam member 83 and the cam member 84 can be rotated relative to the rotation shaft 33. The cam member 83 and the cam member 84 are disposed coaxially with the rotation shaft 33 independently of the fixed pulley 31 and the movable pulley 32 of the primary pulley 30P. That is, the cam members 83 and 84 are not rotated even when the primary pulley 30P is rotated. Besides, the cam member 84 is a fixed cam member which is fixed in the rotation direction and in the axial direction. The cam member 83 is a movable cam member which is arranged to be rotated relative to the cam member 84, and to be moved in the axial direction. Moreover, the movable cam member 83 includes a sliding surface 83b which is positioned on a side opposite to the cam surface 83a, and which is slidably abutted on a back surface 32a of the movable pulley 32 through a thrust bearing and so on.

The electric actuator 80A rotationally drives the movable cam member 83 so that the cam surface 83a of the movable cam member 83 is rotated relative to the cam surface 84a of the fixed cam member 84. With this, the electric actuator 80A moves the movable cam member 83 in the axial direction of the rotation shaft 33 along the inclinations of the cam surface 83a and the cam surface 84a. With this, the electric actuator 80A moves the movable pulley 32 in the axial direction of the rotation shaft 33, so as to adjust the groove width of the V groove of the primary pulley 30P.

Moreover, the electric actuator 80A includes a worm gear mechanism 82 including a worm (screw gear, crossed helical gear) 82a, and a worm wheel (helical gear) 82b engaged with this worm 82a; and an electric motor (gear shift motor) 81 arranged to rotatably drive the worm 82a. The worm wheel 82b is disposed coaxially with the rotation shaft 33. The worm wheel 82b is connected by serration so as to rotate as a unit with the movable cam member 83, and to allow the movement of the movable cam member 83 in the axial direction. With this, when the electric motor 81 is actuated to rotationally drive the worm 82a, the worm wheel 82b is rotated to pivot the movable cam member 83, so that the groove width of the V groove of the primary pulley 30P is adjusted.

The adjustment of the groove width of the V groove of the primary pulley 30P by the shift mechanism 8 is performed while receiving the thrust of the secondary pulley 30S which is generated by the thrust generating mechanism 9. When the groove width of the V groove of the primary pulley 30P is decreased, the groove width of the V groove of the secondary pulley 30S which is connected through the belt is increased. Accordingly, it resists the thrust by the thrust generating mechanism 9. When the groove width of the V groove of the primary pulley 30P is increased, the groove width of the V groove of the secondary pulley 30S is decreased. Accordingly, the thrust by the thrust generating mechanism 9 is used.

For example, when the groove width of the V groove of the primary pulley 30P is decreased, the electric motor 81 is actuated so as to separate the movable cam member 83 from the fixed cam member 84. In accordance with this actuation, the winding radius of the belt 37 with respect to the primary pulley 30P is increased. Consequently, the tension of the belt 37 is increased. The increase of the tension of the belt 37 is acted to decrease the winding radius of the belt 37 with respect to the secondary pulley 30S. The increase of the groove width of the V groove of the secondary pulley 30S is needed for the decrease of the winding radius of the belt 37 with respect to the secondary pulley 30S. In the thrust generating mechanism 9 of the secondary pulley 30S, the effect (resistance force) to resist this increase of the groove width is generated as the thrust. Accordingly, the electric actuator 80A drives the movable cam member 83 to resist this thrust.

Moreover, when the groove width of the V groove of the primary pulley 30P is increased, the electric motor 81 is actuated so that the movable cam member 83 is moved closer to the fixed cam member 84. At this time, the winding radius of the belt 37 with respect to the primary pulley 30P is decreased, so that the tension of the belt 37 is decreased. The decrease of the tension of the belt 37 causes the slippage between the secondary pulley 30S and the belt 37. The movable pulley 35 of the secondary pulley 30S follows to the belt 37. However, the slippage of the fixed pulley 34 with respect to the belt 37 is generated. In accordance with this slippage, a torsion is generated between the fixed pulley 34 and the movable pulley 35. The thrust of the secondary pulley 30S is increased (strengthened) in accordance with this torsion between the fixed pulley 34 and the movable pulley 35.

[Auxiliary Electric Motor]

This variator 3 of the automatic transmission 2 is provided with an auxiliary electric motor 10 directly connected to the rotation shaft 33 of the primary pulley 30P. This auxiliary electric motor 10 rotationally drives the rotation shaft 33 during the switching operation by the engaging clutch mechanism 5a, so as to promote the rotation synchronism of the input side and the output side of one of the gear stages of the auxiliary transmission mechanism 4.

[Control Device]

As shown in FIG. 1, this vehicle includes an EVECU 110 configured to totally control the electric vehicle; and a CVTECU 100 configured to control main parts of the automatic transmission (CVT with the auxiliary transmission mechanism) 2. Each of the ECUs is a computer constituted by memories (ROM and RAM), CPU and so on. The CVTECU 100 is configured to control the actuations of the electric motor 81 constituting the electric actuator 80A of the shift mechanism 8, and the switching electric actuators 50A and 50B, and so on, based on command or information from the EVECU 110, and information from other sensors and so on.

[Operations and Effects]

The present embodiment is constituted as described above. Accordingly, it is possible to obtain following operations and effects.

The automatic transmission 2 is constituted by the variator (the belt type continuously variable transmission mechanism) 3, the auxiliary transmission mechanism (the constantly meshed parallel shaft type gear transmission mechanism) 4, and the direct connection gear mechanism 20. Accordingly, the CVTECU 100 can select and use three main power transmitting modes shown in FIG. 3 by using, for example, a shift map shown in FIG. 4.

Figure 3:
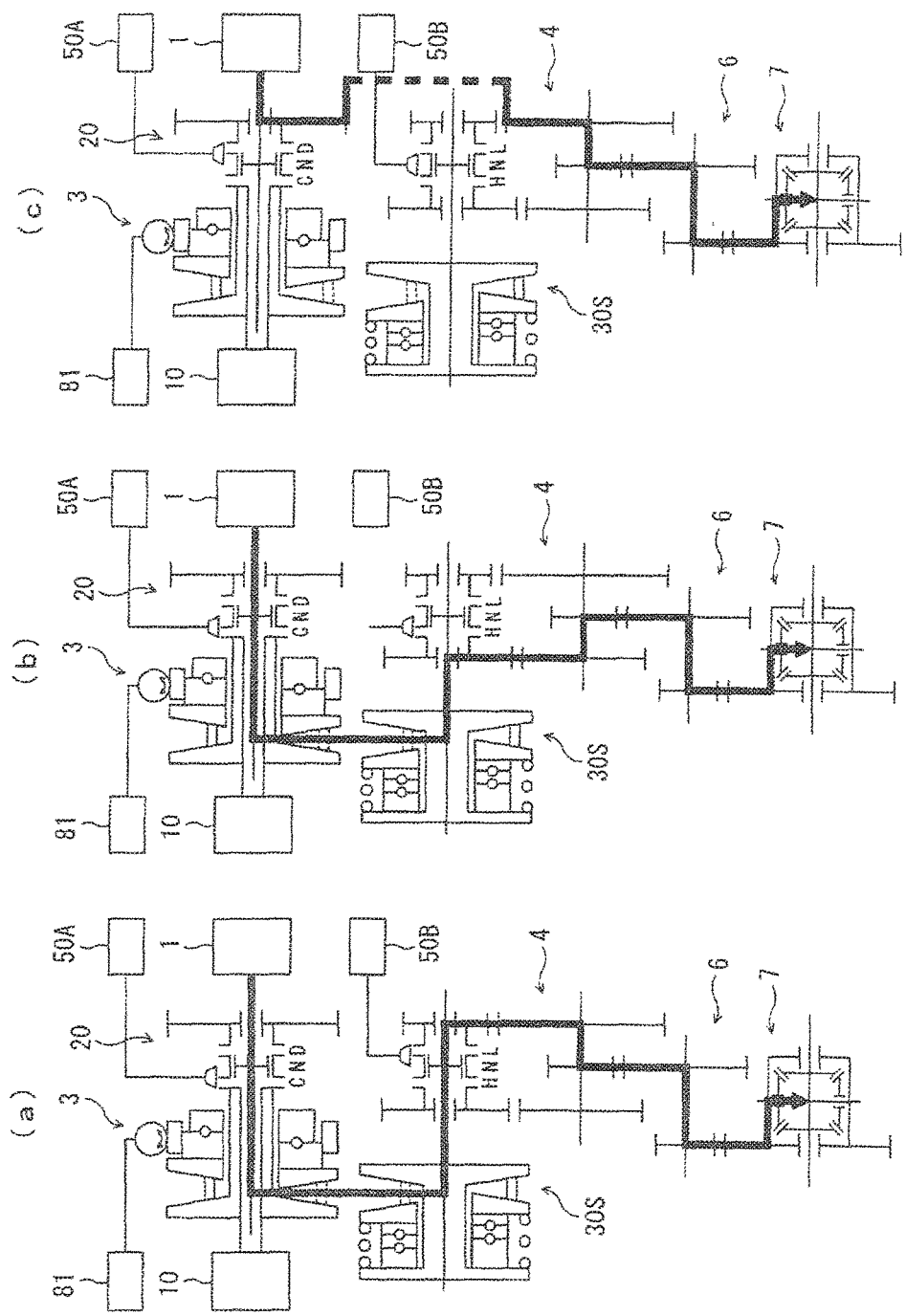
FIG. 3 are views for illustrating a power transmitting mode of the driving system unit of the vehicle which is provided with the automatic transmission according to the one embodiment.

At the normal start of the vehicle, the CVT low mode in which the variator 3 is used and the auxiliary transmission mechanism is switched to the first speed (the Low) is selected, as shown in FIG. 3(*a*). When the vehicle speed is increased after the start, the CVT high mode in which the variator 3 is used and the auxiliary transmission mechanism 4 is switched to the second speed (the High) is selected, as shown in FIG. 3(*b*). In general, it is possible to handle the many running situations by this CVT high mode.

Figure 4:
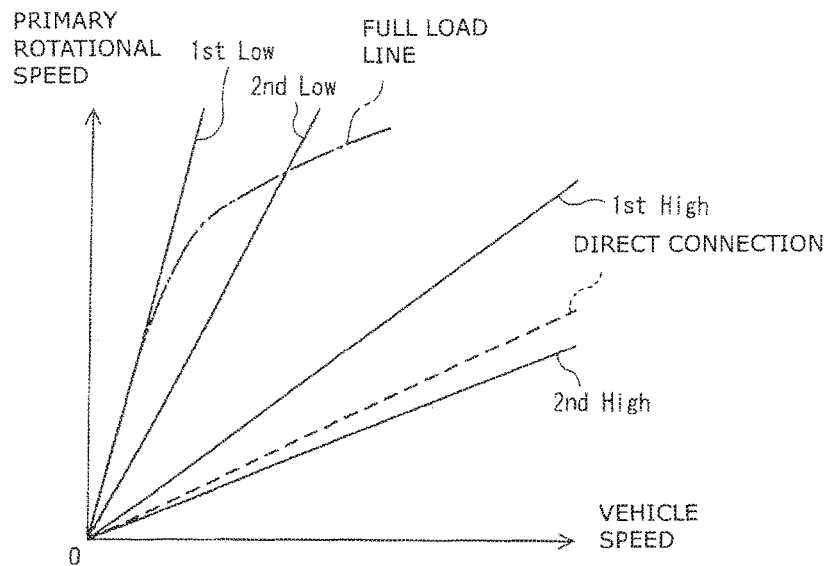
FIG. 4 is a view showing one example of shift map of the automatic transmission according to the embodiment.

In this way, by using the auxiliary transmission mechanism 4, it is possible to run in a wide range of the transmission gear ratio from a state (1st Low) in which the variator 3 is brought to the lowest in the CVT low mode where the auxiliary transmission mechanism 4 is brought to the first speed (the Low), to a state (2nd High) in which the variator 3 is brought to the highest in the CVT high mode where the auxiliary transmission mechanism 4 is brought to the second speed (the High), as shown in FIG. 4. By increasing the width of the transmission gear ratio of the automatic transmission 2, it is possible to decrease the load of the electric motor 1 of the driving source. Accordingly, it is possible to decrease the size of the electric motor 1, and thereby to decrease the entire size of the power train. Moreover, it is possible to use the region in which the good efficiency of the electric motor 1 is obtained, and thereby to improve the efficiency of the power train. With this, it is possible to increase the cruising range (driving range) of the electric vehicle.

Moreover, when the vehicle runs on the highway at the high speed, the direct connection mechanism 20 is used as shown in FIG. 3(*b*). With this, it is possible to attain the power transmission by the gear having the high transmitting efficiency. Accordingly, it is possible to improve the energy efficiency for the above effects, and to increase the cruising range of the electric vehicle. Besides, in a case where the transmission gear ratio by the direct connection gear mechanism 20 is set to a value slightly smaller than the transmission gear ratio of the second speed highest as shown in a broken line of FIG. 4, it is possible to decrease the load of the motor at the high speed running, to contribute to the increase of the cruising range of the electric vehicle.

At the switching of the three power transmitting modes, the synchronous rotation is performed by using the electric motor 1 and the auxiliary electric motor 10. With this, it is possible to promote the synchronous rotation, and to decrease the shift time period. Moreover, it is possible to decrease the shift shock. Furthermore, it is possible to surely perform the adjustment of the synchronism by the synchronous rotation by the electric motor 1 and the auxiliary electric motor 10, and to decrease the cost of the device by omitting the synchronous mechanism and so on.

For example, when the auxiliary transmission mechanism 4 is switched between the first speed (the Low) and the second speed (the High) by the engaging clutch mechanism 5B, the rotation of the rotation shaft 43 of the auxiliary transmission mechanism 4 is synchronized with the rotation of the gear 41 or the gear 42. In this case, the electric motor 1 and the auxiliary electric motor 10 are actuated to be cooperated with each other. With this, it is possible to rapidly obtain the synchronism by overcoming the large inertia mass of the variator 3, and to decrease the shift time periods.

Moreover, when the engaging clutch mechanism 5A switches a state in which the variator 3 is used, and a state in which the direct connection gear mechanism 20 is used, the input rotation member and the output rotation member of the engaging clutch mechanism 5A are brought to the synchronous rotation state. In this case, it is possible to use the electric motor 1 and the auxiliary electric motor 10.

For example, in a case of switching from the state in which the direct connection gear mechanism 20 is used, to a state in which the variator 3 is used, it is possible to rapidly switch by the following process.

(1) The engaging clutch mechanisms 5A and 5B are brought to the neutral state.

(2) It is controlled so that the rotation of the electric motor 1 which is the driving source is synchronized with the rotation of the rotation shaft 33 of the input portion (the primary pulley) 30P of the variator 3 while promoting the synchronous rotation of the gear (the gear 41 or the gear 42) corresponding to the gear stage to be attained, and the rotation shaft 43 of the auxiliary transmission mechanism 4, through the variator 2 by the auxiliary electric motor 10.

(3) The clutch mechanism 5a being in the neutral state is switched to the CVT position (C) so that the member on the input shaft 2A's side (the internal teeth 52a of the sleeve 52) and the input rotation member (the external teeth 38 of the rotation shaft 33) of the primary pulley 30P of the variator 3 are engaged with each other. The engaging clutch mechanism 5B being in the neutral state is switched to be connected to the gear (the gear 41 or the gear 42) corresponding to the gear stage to be attained.

With this, it is possible to switch the engaging clutch mechanisms 5A and 5B during the short time periods. It is difficult to provide the torque decrease (torque release) feeling. It is possible to improve the drive feeling of the shift.

Beside, the auxiliary electric motor 10 according to this embodiment merely uses for the synchronous rotation at the shift. Accordingly, it is possible to employ the small motor having the small output, and to suppress the increase of the cost of the device.

Moreover, the large torque is added to the power transmitting system for the increase of the torque, on the more downstream side of the power transmitting path of the driving system unit of the vehicle. However, in a case where the auxiliary electric motor 10 is connected to the rotation shaft 33 of the primary pulley 30P on the relatively upstream side of the power transmitting path, it is easy to employ the small motor which has the small output, and which corresponds to the low torque.

Besides, it is conceivable that the output of this auxiliary electric motor 10 is used for the torque assist for driving the vehicle. In this case, the motor having the suitable output is employed as the auxiliary electric motor 10.

On the other hand, in a case of switching from the state in which the variator 3 is used, to the state in which the direct connection gear mechanism 20 is used, the both engaging clutch mechanisms 5A and 5B are brought to the neutral state. Then, the rotation of the electric motor 1 is controlled to be synchronized with the rotation of the input gear 21. When the rotations are brought to the synchronous state, the engaging clutch mechanism 5A being the neutral state is switched to the direct connection position (D) so that the member on the input shaft 2A's side (the internal teeth 52a of the sleeve 52) and the member on the input gear 21's side (the external teeth 52a) are engaged with each other.

Besides, the engaging clutch mechanism 5B is maintained to the neutral state during the direct driving state.

Moreover, it is possible to obtain the following operations and effects by the torque cam mechanism (the torque cam device) 90.

At the driving, that is, at the power transmission from the drive cam member 91 to the driven cam member 93 (when the power is transmitted from the drive cam member 91 to the driven cam member 93), the first drive cam surface 91d of the drive cam member 91 and the second drive cam surface 92d of the intermediate cam member 92 are abutted on each other, so that the power is transmitted. At the coast, that is, at the power transmission from the driven cam member 93 to the drive cam member 91 (when the power is transmitted from the driven cam member 93 to the drive cam member 91), the first driven cam surface 93c of the driven cam member 93 and the second driven cam surface 92c of the intermediate cam member 92 are abutted on each other, so that the power is transmitted.

These first drive cam surface 91d, second drive cam surface 92d, first driven cam surface 93c and the second driven cam surface 92c which have the annular shapes can be formed around the entire circumference of the annular shape. It is possible to ensure the length of the cam surface by the entire circumference.

FIG. 9(a) is a schematic circumferential view in a case where the torque cam device is used without using the intermediate cam. As shown in FIG. 9(a), the drive cam surface 192d and the driven cam surface 192c can only ensure the length of the cam surface only by the half of the entire circumference of the annular shape. On the other hand, FIG. 9(b) is a schematic circumference view in a case where a difference in height of the cam surfaces of the torque cam mechanism 90 (corresponding to the cam stroke) according to the present invention is set identical to that of FIG. 9(a). In case of this torque cam mechanism 90, the respective cam surfaces 91d and 93c (also the cam surfaces 92d and 92c (not shown)) can be formed around the entire annular circumferences. Accordingly, it is possible to substantially double the length of the cam surfaces. Consequently, the inclination angle α2 of the cam surfaces can be set to a value smaller than the inclination angle α1 of the case in which the intermediate cam is not used (α2<α1) while ensuring the cam stroke amount. It is possible to increase the generated thrust.

Moreover, the respective connection surfaces 91j, 92j, and 93j are formed, respectively, in directions along the rotation axial line (in the direction parallel to the rotation axis line). Accordingly, the torque cam mechanism 90 is rapidly actuated.

That is, at the drive, the torque cam mechanism 90 is brought to the state where the power is transmitted from the drive cam member 91 toward the driven cam member 93, as shown in FIG. 8(a). The first drive cam surface 91d of the drive cam member 91 presses the second drive cam surface 92d of the intermediate cam member 92 (cf. an arrow F1), so that the connection surface 92j of the intermediate cam member 92 is abutted on the connection surface 93j of the driven cam member 93.

The connection surfaces 92j and 93j are formed, respectively, in the directions along the rotational axis lines. Accordingly, a component force F2 is acted to the second drive cam surface 92d in the rotation axis line direction along the connection surfaces 92j and 93j. With this, the intermediate cam member 92 is pressed toward the driven cam member 93, as shown in FIG. 8(b). The second driven cam surface 92c of the intermediate cam member 92 is abutted on the first driven cam surface 93c of the driven cam member 93.

Moreover, when the power is started to be transmitted from the drive cam member 91 toward the driven cam member 93, the first drive cam surface 91d of the drive cam member 91 is slid along the second drive cam surface 92d of the intermediate cam member 92, so as to generate the thrust F3.

In this way, the torque cam mechanism 90 is rapidly actuated.

On the other hand, in a case where the end surfaces 91j', 92j', and 93j' of the cam members 91', 92', and 93' are inclined so as not to be along the rotational axis line as shown in FIG. 8(d), the thrust F4 by that angle is generated by the torque at the impact of the cam member 92' and the cam member 93' by the pressing force F' which is applied to the intermediate cam member 92 from the drive cam member 91. Accordingly, the cam member 92' is moved and returned toward the side of the cam member 91'. Consequently, the operation of the torque cam mechanism 90 is delayed.

Moreover, the second drive cam surface 92d and the second driven cam surface 92c of the intermediate cam member 92 are formed to have the rotation shift (deviation) in the rotational direction. Accordingly, it is possible to avoid the positional interference of the cam surfaces 92d and 92c, and thereby to suppress the axial length of the intermediate cam member 92. Moreover, in a case where the phase shift of the cam surfaces 92d and 92c is set to 90 degrees, it is possible to suppress the axial length of the intermediate cam member 92 at the maximum degree.

[Others]

Hereinbefore, the embodiment according to the present invention is illustrated. However, the present invention is not limited to the embodiment. It is possible to implement the present invention by appropriately varying the embodiment, or by partially employing the embodiment, as long as the it is not deviated from the gist of the present invention.

For example, in the above-described embodiment, the engaging clutch mechanisms 5A and 5B employ three position type to simplify the configuration of the device. A combination of two engaging clutch mechanisms of two position type can be used to one or both of these engaging clutch mechanisms 5A and 5B.

Moreover, the torque cam mechanism (the torque cam device) 90 of the thrust generating mechanism 9 is not limited to be employed to the pulley devices 30P and 30S. This torque cam device 90 can be widely applied to two rotating members which are provided coaxially with the shaft of the power transmitting system, and which are arranged to be moved relative to each other in the rotation direction and in the axial direction, for generating the torque in the axial direction in accordance with the rotational phase difference.

Furthermore, the pulley devices 30P and 30S in which this torque cam device 90 is applied can be applied to the hybrid electric vehicle, and the vehicle driven by the engine, in addition to the electric vehicle.

Moreover, the mechanical reaction force mechanism is not limited to the end surface cam mechanism shown in the embodiment. In the case of the end surface cam mechanism, the mechanism having the torque capacity can be constituted to the small size.

Furthermore, in the above-described embodiment, the synchronism mechanism is not provided to the engaging portions of the engaging clutch mechanism 5A and 5B. However, in a case where the synchronism mechanism is provided to the engaging portions, the high accuracy of the rotation synchronism control is not needed. Accordingly, it is possible to operate the engagement of the clutch mechanisms 5A and 5B before the completion of the rotation synchronism, and to decrease the time period needed for the shift.

The invention claimed is:

1. A torque cam device comprising:
   a drive cam member which includes a first drive cam surface which has an annular shape, and which is arranged to be rotated by receiving a rotation torque;
   a driven cam member which includes a first driven cam surface that has an annular shape, and that confronts the first drive cam surface, and which is arranged to be driven to be rotated by the drive cam member; and
   an intermediate cam member which includes a second drive cam surface that is formed on one end of the intermediate cam member, and that is arranged to be abutted on the first drive cam surface, a second driven cam surface that is formed on another end of the intermediate cam member, and that is arranged to be abutted on the first driven cam surface, and which is arranged to be rotated relative to the drive cam member and the driven cam member,
   the first drive cam surface and the second drive cam surface being abutted on each other when power is transmitted from the drive cam member to the driven cam member, and
   the first driven cam surface and the second driven cam surface being abutted on each other when power is transmitted from the driven cam member to the drive cam member,
   wherein each of the first drive cam surface, the first driven cam surface, the second drive cam surface, and the second driven cam surface has an annular entire circumference which is equally divided into two, and which is a helical curve according to an angle of the cam, and stepped connection surfaces are formed on portions between the equally divided helical surfaces,
   wherein when power is transmitted from the drive cam member to the driven cam member, the connection surface of the first driven cam surface and the connection surface of the second driven cam surface are abutted on each other, and
   wherein when power is transmitted from the driven cam member to the drive cam member, the connection surface of the first drive cam surface and the connection surface of the second drive cam surface are abutted on each other.

2. The torque cam device as claimed in claim 1, wherein second drive cam surfaces and connection surfaces of portions between the second drive cam surfaces are disposed to have a phase shift with second driven cam surfaces and connection surfaces between portions of the second driven cam surfaces.

3. The torque cam device as claimed in claim 1, wherein the connection surfaces are formed, respectively, in directions along a rotation axial line.

4. The torque cam device as claimed in one of claim 1, wherein the first drive cam surface, the first driven cam surface, the second drive cam surface, and the second driven cam surface have an identical cam angle.

5. The torque cam device as claimed in one of claim 1, wherein each of the first drive cam surface, the first driven cam surface, the second drive cam surface, and the second driven cam surface includes a groove formed in a direction in which each of the annular shapes extends, and a ball disposed to be rolled on the groove; and the respective cam surfaces are abutted through the ball.

6. A belt-type continuously variable transmission device comprising:
   a torque cam device including
      a drive cam member which includes a first drive cam surface which has an annular shape, and which is arranged to be rotated by receiving a rotation torque;
      a driven cam member which includes a first driven cam surface that has an annular shape, and that confronts the first drive cam surface, and which is arranged to be driven to be rotated by the drive cam member; and
      an intermediate cam member which includes a second drive cam surface that is formed on one end of the intermediate cam member, and that is arranged to be abutted on the first drive cam surface, a second driven cam surface that is formed on another end of the intermediate cam member, and that is arranged to be abutted on the first driven cam surface, and which is arranged to be rotated relative to the drive cam member and the driven cam member,
      the first drive cam surface and the second drive cam surface being abutted on each other when power is transmitted from the drive cam member to the driven cam member,
      the first driven cam surface and the second driven cam surface being abutted on each other when power is transmitted from the driven cam member to the drive cam member,
      wherein each of the first drive cam surface, the first driven cam surface, the second drive cam surface, and the second driven cam surface has an annular entire circumference which is equally divided into two, and which is a helical curve according to an angle of the cam, and stepped connection surfaces are formed on portions between the equally divided helical surfaces,
      wherein when power is transmitted from the drive cam member to the driven cam member, the connection surface of the first driven cam surface and the connection surface of the second driven cam surface are abutted on each other, and wherein when power is transmitted from the driven cam member to the drive cam member, the connection surface of the first drive cam surface and the connection surface of the second drive cam surface are abutted on each other, two pulley devices each including a fixed pulley and a movable pulley; and a belt wound around the two pulley devices to transmit power, wherein the torque cam device is arranged to generate a clamping force to act on at least one of the two pulley devices.

7. The belt-type continuously variable transmission device as claimed in claim 6, wherein:

the drive cam member and the movable pulley are arranged to rotate together;

the driven cam member and the fixed pulley are arranged to rotate together; and the intermediate cam member is disposed to be rotated relative to a rotation shaft of at least one of the pulley devices.

\* \* \* \* \*